Figure 1:
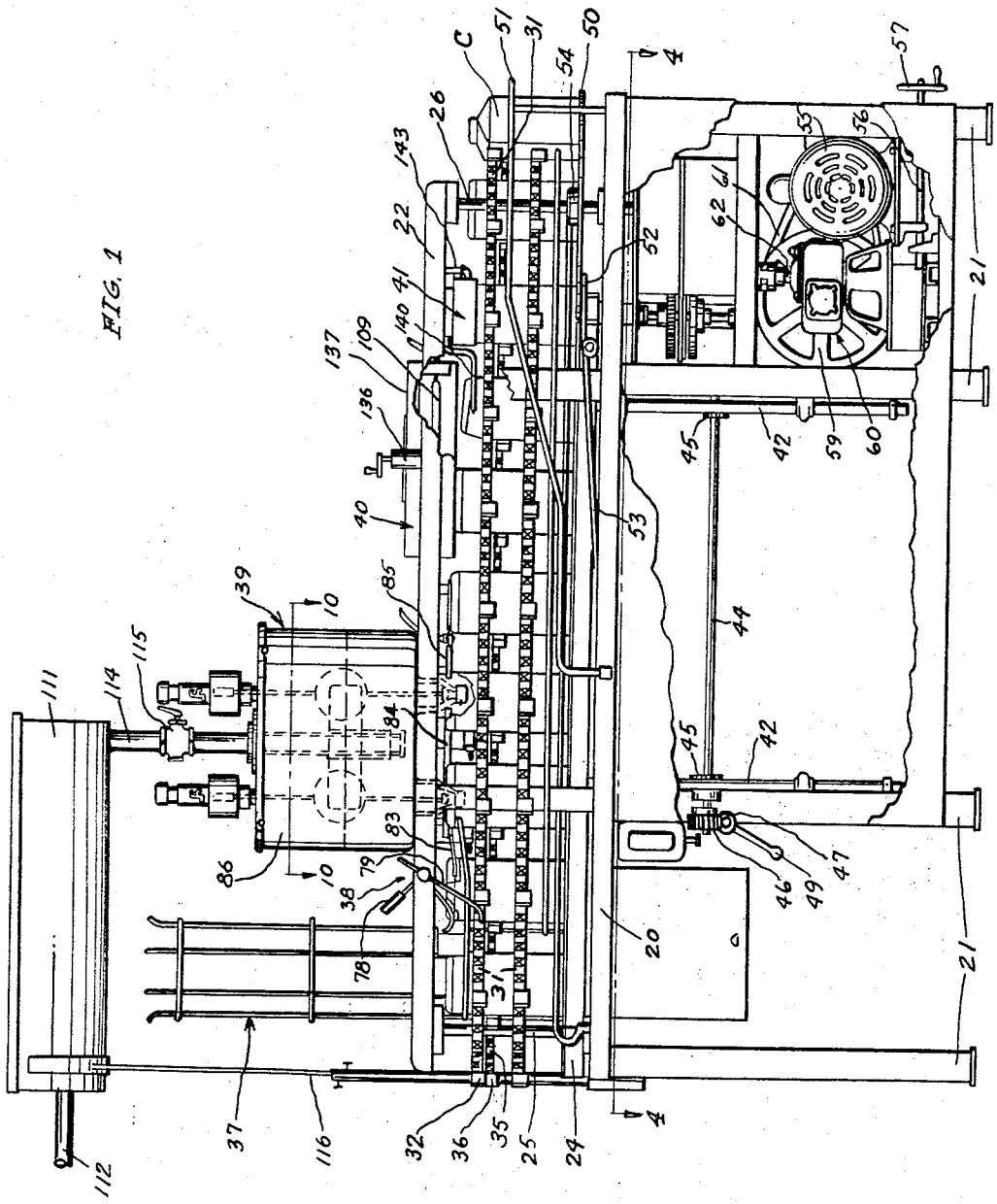

Nov. 14, 1967 W. C. CRAMER 3,352,458
CONTAINER FILLING APPARATUS
Filed May 14, 1964 5 Sheets-Sheet 1

INVENTOR.
Ward C. Cramer
BY
Attorney

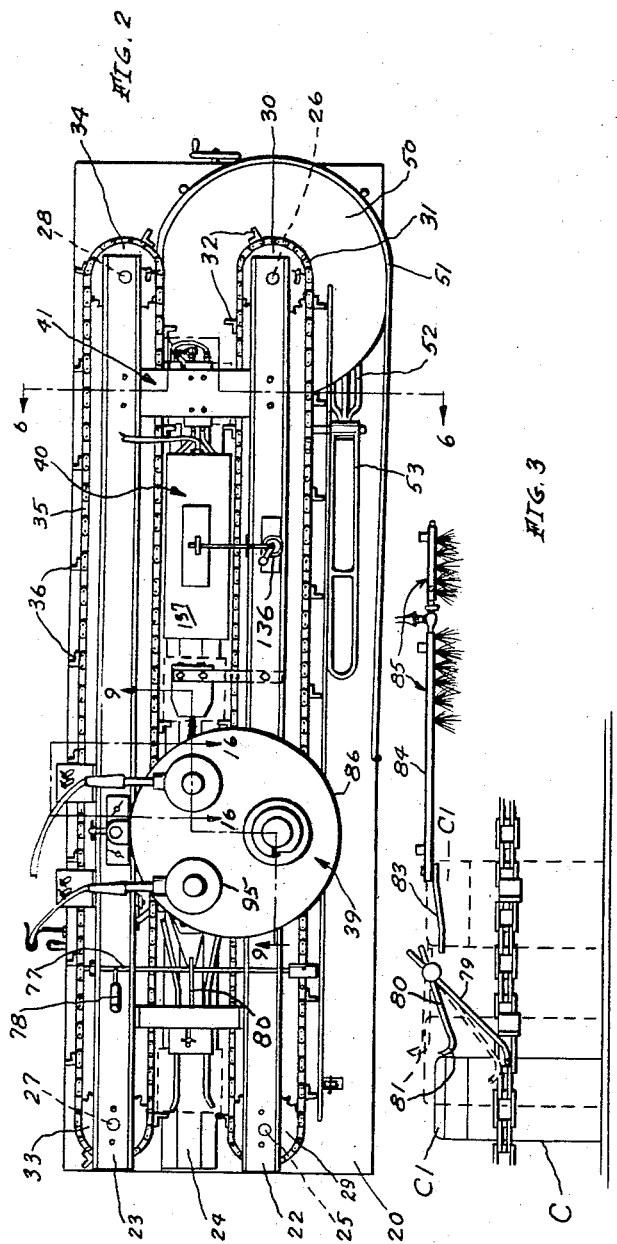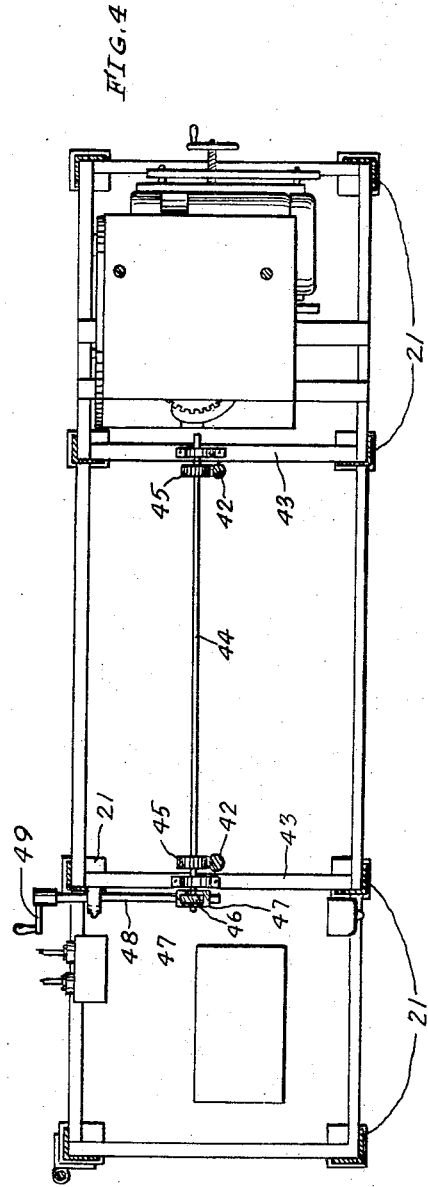

Nov. 14, 1967 W. C. CRAMER 3,352,458
CONTAINER FILLING APPARATUS
Filed May 14, 1964 5 Sheets-Sheet 3

INVENTOR.
Ward C. Cramer
BY
Attorney

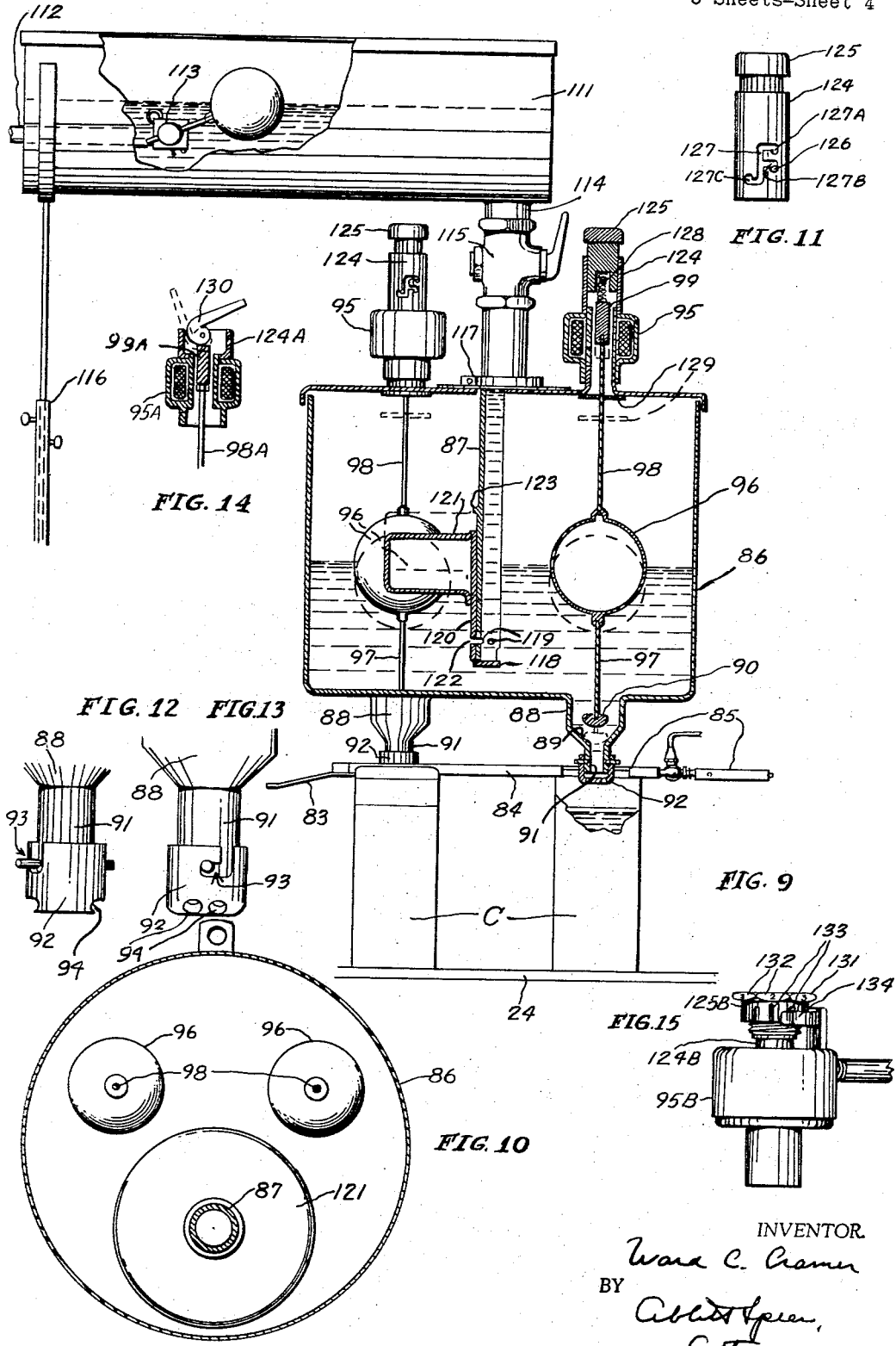

Nov. 14, 1967  W. C. CRAMER  3,352,458
CONTAINER FILLING APPARATUS
Filed May 14, 1964  5 Sheets-Sheet 5
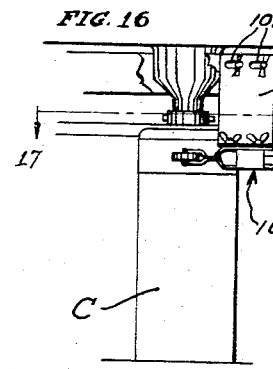
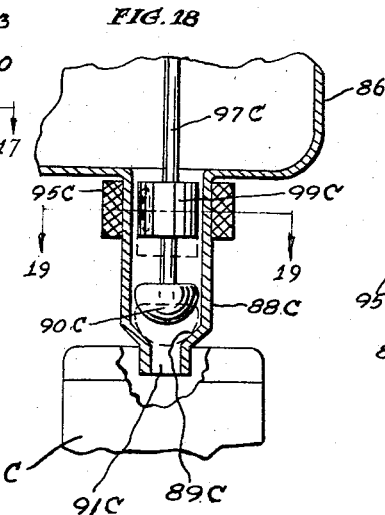
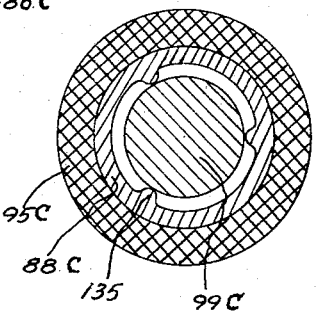
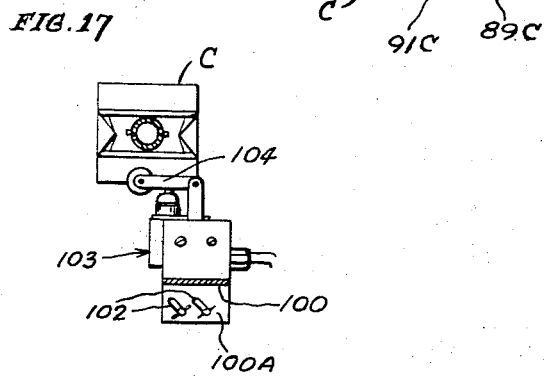
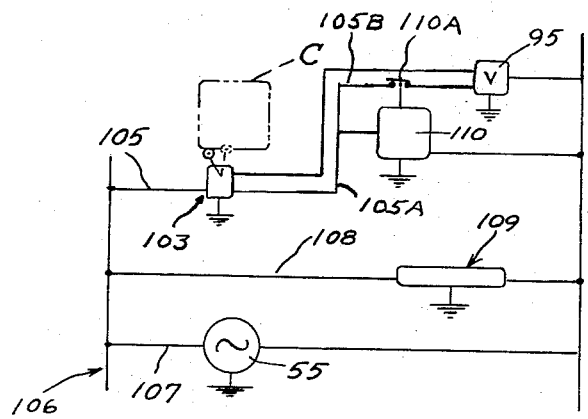
INVENTOR.
Ward C. Cramer
BY
Attorney ical sealing of the containers and this objective is accomplished by pass-
United States Patent Office 3,352,458
Patented Nov. 14, 1967

3,352,458
CONTAINER FILLING APPARATUS
Ward C. Cramer, 81 Woburn St.,
Medford, Mass. 02155
Filed May 14, 1964, Ser. No. 367,501
9 Claims. (Cl. 222—66)

The present invention relates to apparatus for use in filling containers and particularly cardboard or plastic containers that may be closed and heat sealed, and to apparatus also operative to close and seal containers of that type.

While apparatus in accordance with the invention is adapted for use with various types of containers and with various liquids, it is herein discussed with particular reference to the filling of containers with milk as that use well illustrates a wide range of problems involved in filling a large number of containers accurately, efficiently, and economically under santitary conditions.

Accuracy in filling containers can be readily attained when the liquid pressure is closely regulated by the expedient of opening a discharge valve for a predetermined interval. In the handling of milk or other liquid where the source, unlike a water system, is limited, its head or pressure must be controlled with the accuracy of that control determining accuracy in the filling of containers.

A principal objectice of the invention is the provision of means for so controlling the head or liquid pressure as to ensure a satisfactorily high degree of accuracy in filling containers. In accordance with the invention, this objective is attained by providing a delivery tank having at least one downwardly opening outlet having a control valve and a surge tank having a float controlled connection with the source and discharging by gravity into the delivery tank through a float controlled connection responsive to the liquid level in the delivery tank. The outlet is opened for a controlled interval at regular intervals and the float controlled surge tank is operative to deliver liquid under a substantially constant head thereto and the opening of the valve controlled outlet and the intervals are so related thereto that the amount of liquid delivered in a delivery interval is equal to that delivered during that interval and the regular interval between valve openings with the float controlled connection in the delivery tank being only a shut-off valve.

Another objective of the invention is to have the containers carried under the filler unit by a conveyor advancing each contained by regular steps at regular intervals. The control valve or valves of the filler units are ecah opened by a container when in a position to be filled and the conveyor speed is readily adjustable, thus providing a basis for accurately adjusting volume.

Another objective of the invention is to have the control valve held closed and released to open in response to a float in the delivery tank, provided that enough liquid is in the tank to ensure accurate operation.

A further objective is to provide defoaming means for use when foaming of the liquid being handled is a problem. In accordance with the invention, this result is achieved with jets of dry steam directed against the foam in the open mouth of each container.

Yet another objective of the invention is to provide means for adjusting the valume of liquid each time a control valve opens, a result accomplished by varying the extent to which the float rigidly connected thereto can rise.

Yet another objective of the invention is that of sealing the containers and this objective is accomplished by passing each container under a heater after being filled and then pressing its open ends together by means of water-cooled jaws.

An additional objective of the invention is to provide a conveyor positively advancing each contained by steps under an opener, a filler unit, a defoamer, a heater, and a sealer.

Another objective of the invention is to enable the apparatus to be used with containers of different heights, a result attained by providing a conveyor for the containers that may be adjusted vertically in relation to the tank outlets, and such other stations as openers, heaters, and sealers.

In the accompanying drawings, there are shown illustrative embodiments of the invention from which these and other of its objectnves, novel features, and advantages will be readily apparent.

Figure 7:
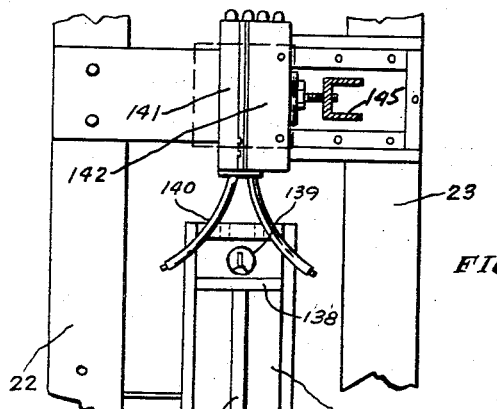
Figure 6:
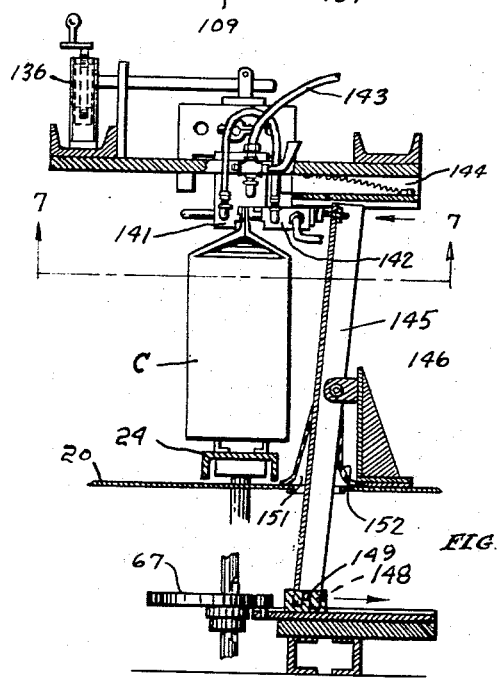
Figure 8:
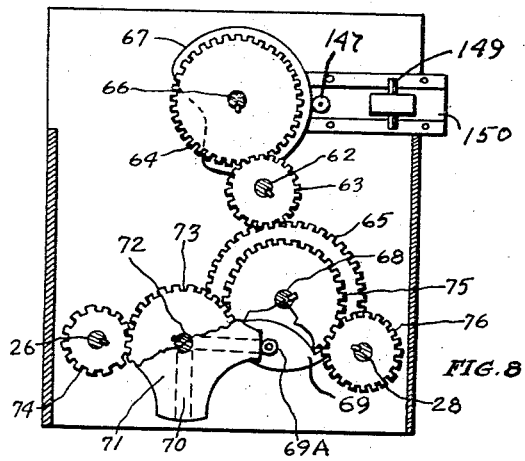
Figure 5:
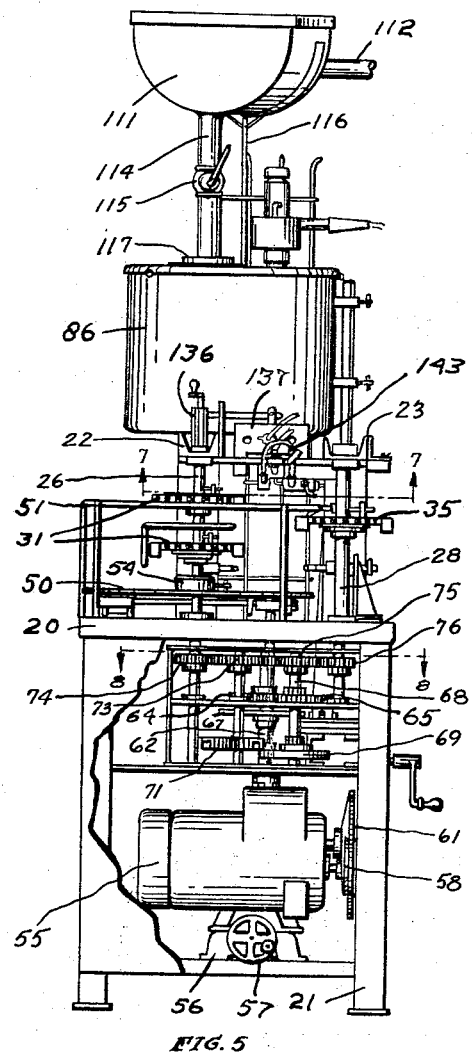

In the drawings:

FIGURE 1 is a side elevational view of a carton in accordance with the invention, FIGURE 2 is a top plan view thereof, FIGURE 3 is a fragmentary view on an increased scale, illustrating the carton opening means and the defoaming jets, FIGURE 4 is a section taken approximately along the indicated lines 4—4 of FIGURE 1, FIGURE 5 is a a view of the carton filler as seen from the carton sealing end thereof, FIGURE 6 is a section, on an increased scale, taken approximately along the indicated line 6—6 of FIGURE 7, FIGURE 7 is a section, on the scale of FIGURE 6, taken along the indicated lines 7—7 of FIGURES 5 and 6, FIGURE 8 is a section taken approximately along the indicated lines 8—8 of FIGURE 5 on a somewhat increased scale, FIGURE 9 is a section of the filler unit taken approximately along the indicated lines 9—9 of FIGURE 2, FIGURE 10 is a section taken approximately along the indicated lines 10—10 of FIGURE 1 but on the scale of FIGURE 9, FIGURE 11 is an elevational view of the valve control showing its three operative positions, FIGURE 12 is a fragmentary side view of one of the discharge caps, FIGURE 13 is a like view but showing the discharge cap as seen from a position at right angles from the position from which FIGURE 12 was taken, FIGURE 14 is a fragmentary section of a control for the discharge valves in accordance with another embodiment of the invention, FIGURE 15 is a side elevation of a control of a discharge valve in accordance with yet another embodiment of the invention, FIGURE 16 is a section taken along the indicated lines 16—16 of FIGURE 1, FIGURE 17 is a section taken approximately along the indicated lines 17—17 of FIGURE 16, FIGURE 18 is a vertical section of another type of discharge valve, FIGURE 19 is a section, on an increased scale, taken along the indicated lines 19—19 of FIGURE 18, and FIGURE 20 is a schematic view of the circuitry.

Carton filling apparatus in accordance with the invention consists of a support 20 mounted on framework including legs 21 with a pair of parallel mounts 22 and 23 supported thereby above the track 24 and extending from end-to-end thereof. Journalled in the ends of the support 20 and of the mount 22 are a pair of vertical shafts 25 and 26 and a like pair of shafts 27 and 28 are journalled in the ends of the support 20 and of the mount 23. The shafts 25 and 26 are shown as provided with pairs of sprockets 29 and 30, respectively, about which are trained chains 31 each provided with lugs 32. The shafts 27 and 28 are also provided with sprockets 33 and 34, respectively, for the chain 35 also provided with spaced lugs 36. In the embodiment of the invention illustrated by the drawing there are shown two chains 31 and one chain 35 but this arrangement can be varied.

The proximate courses of the chains 31 and 35 are located adjacent opposite edges of the track 24 and travel in the same direction, from left to right as viewed in FIGURES 1 and 2, and the lugs 32 and 36 are then transversely alined thereby providing a conveyor for positively conveying cartons C along the track 24 from a hopper 37, see FIGURE 1, to the other end of the support 20 with each carton C passing under but in operative relation to a generally indicated carton opener 38, a generally indicated filler unit 39, a generally indicated carton heater 40 and a generally indicated sealer unit 41. The hopper 37 may be manually loaded with cartons C or such cartons may be fed thereto automatically.

In order that the apparatus may be used in the filling of cartons of different heights, the height of the track 24 is adjustable relative to the carton opener 38, the filler unit 39, and the carton heater 40 and sealing unit 41. To accomplish this result, see FIGURES 1 and 4, the track 24 is supported by vertically disposed racks 42. The intermediate legs 21 are shown as interconnected by cross members 43. A shaft 44 is rotatably supported thereby and provided with pinions 45, one for each rack 42, and a gear 46 in mesh with a worm 47 on a transverse shaft 48 rotatably supported by one of the cross members 43 and provided with a crank 49 thereby enabling the height of the track 24 to be easily and accurately adjusted as may be required not only for optimum operating conditions but also as may be required by cartons of different capacity and cartons of different structural features of the same capacity.

Cartons C are carried from the outfeed end of the track 24 by the conveyor partway around the table 50 rotatably supported by the vertically disposed shaft 26 and partially surrounded by a guide rail 51 which extends along one side of the support from which they can be manually removed. Where the cartons are to be transferred to another conveyor, such other conveyor may have its infeed end pick-off where desired relative to the table 50. A ramp 52, see FIGURES 1 and 3, effects transfer of cartons C from the rotating table 50 to the support 20. The ramp 52 is carried by the track 24 and moves therewith when the vertical position of the track is varied. For that reason, the track 24 includes a hinged section 53. The table 50 has a releasable set-screw type of connection 54 with its shaft 28 thereby enabling its vertical position to be easily adjusted, upwardly or downwardly as required by the vertical position of the track 24.

The conveyor drive, see FIGURES 1 and 5, is of the Reeves type and consists of a motor 55 mounted for variable speed adjustment along a way 56 by means of a crank 57, the way 56 being supported between the legs 21 at the outfeed end of the conveyor. The adjustable Reeves motor pulley 58 is connected to the wheel 59 of a generally indicated gear box 60 by a belt 61, see FIGURES 1 and 5. The vertical drive shaft 62 has a gear 63 meshing with gears 64 and 65, see FIGURE 8. The gear 64 is on a vertical shaft 66 provided with a cam 67 which actuates the carton sealer 41 which will be later described in detail.

The gear 65 is on a vertical shaft 68 which also carries a member 69 provided with a stud 69A for successive entry into the radial slots 70 of a rotor 71 thereby to cause intermittent rotation of the shaft 72 on which the rotor 71 is fast. A gear 73 on the shaft 72 meshes with a gear 74 on the shaft 26 and with a transmission gear 75 shown as mounted on the shaft 68 for rotation independently thereof, but which could be on a separate shaft if the gear size is so indicated. The gear 75 is shown as meshing with the driving gear 76 on the shaft 28. By these or equivalent means, the cartons C are moved, in the embodiment of the invention illustrated by the drawings, step-by-step with each carton C being stopped twice under the filler unit 39, once under each of its outlets, after it has been opened by the carton opener 38.

The carton opener 38, see FIGURES 1–3 and 9, consists of a shaft 77 supported transversely of the supports 22 and 23 with one end provided with a counterweight 78 and the other end provided with a depending arm 79 disposed so that its extremity is engaged by the lugs 36 of the outer course of the upper chain 35, thus to raise the arm 79 thereby to turn the shaft 77 against the action of the counterweight 78. The shaft 77 has an arm 80 having an upwardly curved, container-opening hook 81, see FIGURE 3, centrally of the path of the conveyed carton C and swung upwardly on such motion, the walls C1 at the mouths of the cartons are opened and spread apart by the spreader 83 at the end of a sub-frame 84 providing headers 85 having a series of jets for discharging dry steam into the open ends of filled cartons to effect defoaming. The sub-frame 84 is detachably attached to the mounts 22 and 23 so that it can be readily removed for cleaning and replaced when defoaming is not necessary or where a different spreader is necessary because of a different carton size or type.

The lugs 32 and 36 of the conveyor chains are spaced so that on each step that the carton conveyor is advanced there are two cartons C under the filler unit 39 which will now be detailed and, in this connection, attention is directed particularly to FIGURES 9 and 10.

The filler unit 39 has a circular delivery tank 86 provided with an inlet 87 and a pair of outlets 88 spaced from each other lengthwise of the track 24 so that each will overlie the open mouth of a container C in both of its positions in which it is stopped under the filler unit 39. Each outlet 88 has an internal seat 89 for a valve 90 and a depending nozzle 91 shown as provided with a cap 92, see FIGURES 12 and 13 connected thereto as by a generally indicated bayonet type of joint 93 and shown as having outlet ports 94 disposed to provide for a desired flow therethrough in a manner minimizing foaming. The caps 92 may be removed and replaced by others providing for a different volumetric flow or one may be replaced by a shut-off cap, not shown, to block all flow through the outlet to the nozzle to which it is attached.

Each valve 90 is adapted to be closed and held closed by an electro-magnet 95 against the action of a float 96 with each float having vertically alined rods 97 and 98 connected thereto. Each rod 97 is connected to a valve 90 and each rod 98 includes a part 99 functioning as the core of an electro-magnet 95.

Reference is now made of FIGURES 16 and 17 wherein there is shown a bracket 100 having lengthwise slots 101 in its vertical part through which it is attached to the support 22. The horizontal part 100A of the bracket 100 has diagonal slots 102 through which the normally closed switch 103 is adjustably attached thereto. The switch 103 has an operation arm 104 engaged and actuated by each opened carton C when it reaches its first position under the filler unit 39, the slots 101 and 102 enabling the proper position of the switch arm to be established with a wide range of carton sizes and shapes. The switch 103 is in a lead 105, see FIGURE 20, of the generally indicated circuit 106 having parallel leads 107 and 108. The lead 107 includes the motor 55 and the lead 108 includes the generally indicated heater 109 of the carton heater 40. The lead 105 includes a parallel lead 105A closed when the switch 103 has been actuated to open the lead 105 to the associated electro-magnet 95. The parallel lead 105A includes a relay 110 whose switch 110A controls the lead 105B to the electro-magnet 95. The relay 110 is the type operable for a predetermined interval, in this case holding the switch 110A open for that interval thereby enabling the electro-magnet 105 to be then energized even if a container C is still in engagement with the switch 103. The relay 110 may be a series 90 manufactured by Industrial Timer Corp. of New Jersey. A like switch and associated circuitry controls delivery of milk through the second outlet. When both outlets 88 are used and the milk presents a foaming problem, it is preferred that a carton C receive somewhat more than 50% of its wanted volume at its first filling stop in order to utilize part of the interval at the second stop for defoaming.

As may be seen in FIGURE 9, a surge tank 111 has an inlet 112, the inlet being horizontal as an aid against defoaming, from a source such as a pasteurizer or homogenizer, for example, (not shown) and controlled by a float valve 113 and an outlet 114 connected to the inlet 87 of the delivery tank 86 as by a valve 115. The support 20 has an adjustable standard 116 supporting one end of the surge tank 111 and has an adjustable collar 117 which enables the extent to which the inlet 87 extends downwardly into the tank 86 to be varied.

As may be seen in FIGURE 9, the inlet 87 has a closed end 118 adjacent which are ports 119. A sleeve 120 slidably fits the inlet 87 and includes an annular float 121 by which the sleeve 120 is slid in response to liquid levels between a low position in which it is held by the end 118 with its ports 122 in registry with the ports 119 and a high position established by the annular shoulder 123 in which the ports 119 are closed.

From the foregoing, it will be apparent that whenever a carton C is under an outlet 88 of the filler unit 39, the electro-magnets 95 in control of the valves are de-energized for the interval determined by the timing relay 110. If there is then a sufficient body of liquid in the delivery tank 86, the valves 90 open and stay open until the electro-magnets 95 are again energized or until the liquid level in the tank drops sufficiently. It will be appreciated that the extent of the reciprocal movement of the valves determines the volume assuring a constant head factor and a fixed interval.

In practice, each electro-magnet 95 includes a sleeve 124 supporting the control cap 125 which has a laterally projecting stud 126 entrant of a vertical slot 127 in the sleeve 124. The slot 127 has, see FIGURE 11, laterally disposed branches 127A, 127B, and 127C each to receive the stud 126 and thus to position the control cap 125 for engagement by the rod 98 to limit the opening of the valve 90 to which it is connected. In the branch 127A, for example, an adjustment for use with one gallon containers is provided while the branch 127B is used where the cartons are of the half gallon capacity, for example. When the stud is entrant of branch 127C the associated valve 90 is closed by the pressure of the spring 128 interposed between the control cap and the part 99 of the rod 98. In this connection, it will be noted that each rod 98 is provided with a disc 129 which limits upward movement of the rod thus positively maintaining solenoid parts operatively associated even though the control cap be removed.

If preferred, the control of the float movement may be effected as illustrated by FIGURE 14 wherein the sleeve 124A of the electro-magnet 95A has a cam 130 rotatable between a position blocking upward movement of the valve rod 98A, when in one position, and permitting predetermined upward movement thereof in its second or released position. As the cam can be stopped in any intermediate position, a wide range of adjustments are possible.

As another means for controlling the upward movement of the valves 90 there is shown, see FIGURE 15, a sleeve 124B, threaded to receive a control cap 125B, has a head 131 providing hexagonal, successively numbered faces 132 with the control cap 125B having a series of graduations in the form of indentations 133 for each face 132 readable with reference to a marker in the form of a spring detent member 134 thereby to provide a micrometer-like adjustment of the valve mounts.

In place of the electro-magnets 95, at the top of the tank 86, the electro-magnets may be associated with the outlets. In this connection, reference is made to FIGURES 18 and 19. The outlet 88C from the delivery tank 86C is similar to the outlet 88 in that it has an internal seat 89C for the valve 90A and a discharge port 91C. The valve 90C is shown as including a stem 97C and a portion 99C serving as a core for the electro-magnet 95C supported by and surrounding the outlet 88C. It will be noted that the inner surface of the outlet 88C is provided with core-centering guides 135.

After a container has been filled, it is stepped along into and through the zone of the heating unit 40 which will not be detailed in connection with which reference is made to FIGURES 5-7. The members 22 support a vertically adjustable mount 136 carrying a reflector 137 housing an infra red tube as the heater 109 by which the upper ends of the mouth of each carton C being advanced by steps below it is softened sufficiently to ensure their being sealed when pressed together. Adjacent the ends of the tube insulating partitions 138 are provided receiving the ends of the tube 109 and at the ends of the reflector there are vents 139 preventing an excessive build-up of heat.

A Teflon protected throat 140 forces the open ends of each carton C together as they enter between the jaws 141 and 142, see FIGURES 6 and 7. While both jaws may be movable, the jaw 141 is shown as fixed with the jaw 142 being transversely movable.

The jaws have passages connected to water conduits 143 by which they are cooled. The jaw 142 is reciprocable in a way 144. An arm 145 is pivotally supported as at 146 with its upper end engaging the jaw 142 to force it inwardly and to maintain the cam 67 and cam follower 147 in engagement. The lower end of the arm 145 is forked as at 148 to straddle the transverse pin 149 on the slide 150 which carries the cam follower 147. The arm 145 passes through an opening 151 in the support 20 and is provided with a flexible boot 152 which prevents spilled milk and steam condensate from entry into the gear drive.

In the operation of apparatus in accordance with the invention, it will be assumed that a supply of milk is available and that the conduit 112 is connected to, say to a pasteurizer or a homogenizer, or whatever the source of supply is. With the valve 115 open and the circuits to the electro-magnets 95 closed, milk enters the tank 86 until shut off in response to the rising of the float 121.

It will be assumed that the track 24 is adjusted vertically to bring the mouths of the containers C into operation relative to the opener 38, the filler unit 39, the heater 40, and the sealer 41 and that corresponding adjustment of the vertical position of the table 50 has been made. With the conveyor in operation, containers C are stepped along the track 24 with each, after its mouth C1 has been spread open, stopping first under one outlet 88 and then the other.

At each stop, an appropriate one of the switches 103 is activated and the electro-magnet 95 in circuit therewith is de-energized so that the float 96 held down thereby is released to rise to open the associated valve 95 provided that a predetermined milk level exists.

While initially, i.e. typically for the first one or two containers, over-filling results because the milk level is initially excessive, having been determined by the float 121. Thereafter, accurate filling occurs as the amount discharged at each dwell is equal to the amount delivered during each cycle consisting of a dwell and the interval between dwells and the surge tank ensures the maintenance of a substantially constant head.

Accurate filling presupposes initial adjustments and such adjustments may be effected by varying the interval of each dwell by changing the conveyor speed or that part of each dwell in which milk is delivered, by varying the size of the holes 94 in the discharge caps 92, and by varying the extent to which the valves 90 can open.

In FIGURE 11, the control cap 125 has three positions, for example, one for use in filling gallon containers, another for one-half gallon filling, and the third, when the associated valve 90 cannot move away from its seat 89. In FIGURE 14, the control cap adjustment is effected by a cam action permitting infinite adjustments while in FIGURE 15, the control cap 132 is micrometer like as to the precision of its adjustments.

The filled but still open containers pass under the defoaming jets, under the heater and then through the sealer.

It will be appreciated that other liquids than milk may be filled with apparatus in accordance with the invention. With some liquids, there is no foaming problem and with some containers differing sealing means would be necessary but with any liquid, a series of any suitable containers can be quickly and accurately filled with apparatus in accordance with the invention.

I claim:

1. In a container filler, a delivery tank having a downwardly opening outlet and a delivery valve in control of said outlet, a surge tank located above said delivery tank and including an inlet for placing it in communication with a large volume liquid supply source and a float-controlled valve in control of said inlet, a conduit effecting gravity communication between said tank and including a float-controlled shut-off valve in said delivery tank, a float within said delivery tank and connected to said delivery valve and operable to open said delivery valve when a predetermined liquid level exists in said delivery tank, electrically operated means to close and hold closed said delivery valve, means to control the volume delivered by said delivery valve when it opens under the influence of said float when said electrically operated means is de-energized, and means to control said delivery valve for a series of cycles, each including an open interval in which said electrically operated means is de-energized and a closed interval in which said electrically operated means is energized, the valve opening, the cycle, and the liquid head being so related that the volume of liquid flowing into the delivery tank during each cycle is equal to that flowing through the outlet during an open interval of said delivery valve.

2. The container filler of claim 1 in which the means to control the volume delivered by the delivery valve when it opens is operable to limit the extent to which said valve opens.

3. The container filler of claim 2 in which the float is rigidly connected to the valve and includes an upwardly extending rod, the electrically operated means is an electromagnet whose core is a part of the rod, a fixed sleeve receives the end of the rod and a control adjustably attached to the sleeve is engageable by the rod to limit the upward movement.

4. The container filler of claim 2 in which the control is a cam.

5. The container filler of claim 2 in which the control is a cap threaded on the sleeve.

6. The container filler of claim 2 in which the control is a cap having a pin and slot connection with the sleeve, the slot extending axially of the sleeve and including laterally extending and vertically spaced pin-receiving pockets.

7. The container filler of claim 2 in which the electrically operated means includes an electro-magnet for closing and holding the delivery valve closed when energized, a lead thereto including a normally closed switch having a second position into which it is moved by contact with a container, a second lead closed in the second position of the switch and including a timing relay placing the electro-magnet in series when energized.

8. The container filler of claim 1 and a cap detachably attached to the outlet of the delivery valve and the cap has a plurality of ports dimensioned to provide for the delivery of a predetermined volume during a predetermined interval during which the delivery valve is open.

9. In a delivery tank, a downwardly opening outlet, a delivery valve in control of said outlet, a float within said tank and connected to said valve to open said valve when a predetermined liquid level exists in said tank, and electrically operated means to close and hold closed said delivery valve against the action of said float.

References Cited

UNITED STATES PATENTS

| | | | |
|---|---|---|---|
| 2,551,427 | 5/1951 | Ellefson | 198—103 X |
| 2,575,544 | 11/1951 | Zinn | 53—373 X |
| 2,604,247 | 7/1952 | Andre. | |
| 2,699,283 | 1/1955 | Okulitch | 141—160 X |
| 2,817,196 | 12/1957 | Ringler | 53—48 X |
| 2,893,445 | 7/1959 | Geitner | 141—286 |
| 2,925,835 | 2/1960 | Mojonnier et al. | 222—70 X |
| 2,962,845 | 12/1960 | Lewis | 53—379 X |
| 3,065,775 | 11/1962 | Keves | 141—160 X |
| 3,200,557 | 8/1965 | Schwenk | 53—39 |

FOREIGN PATENTS

| | | |
|---|---|---|
| 103,520 | 1/1936 | Netherlands. |

TRAVIS S. McGEHEE, *Primary Examiner.*

FRANK E. BAILEY, *Examiner.*

R. L. FARRIS, *Assistant Examiner.*